Nov. 21, 1939.                T. F. PEARSON                    2,180,767
                SKIMMING DEVICE FOR GLASS TANKS OR FURNACES
                    Filed April 29, 1937          4 Sheets-Sheet 1
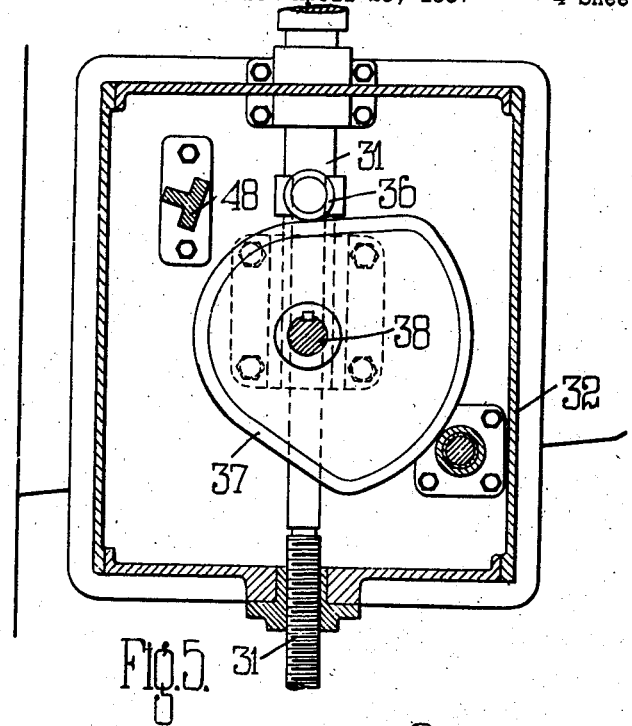
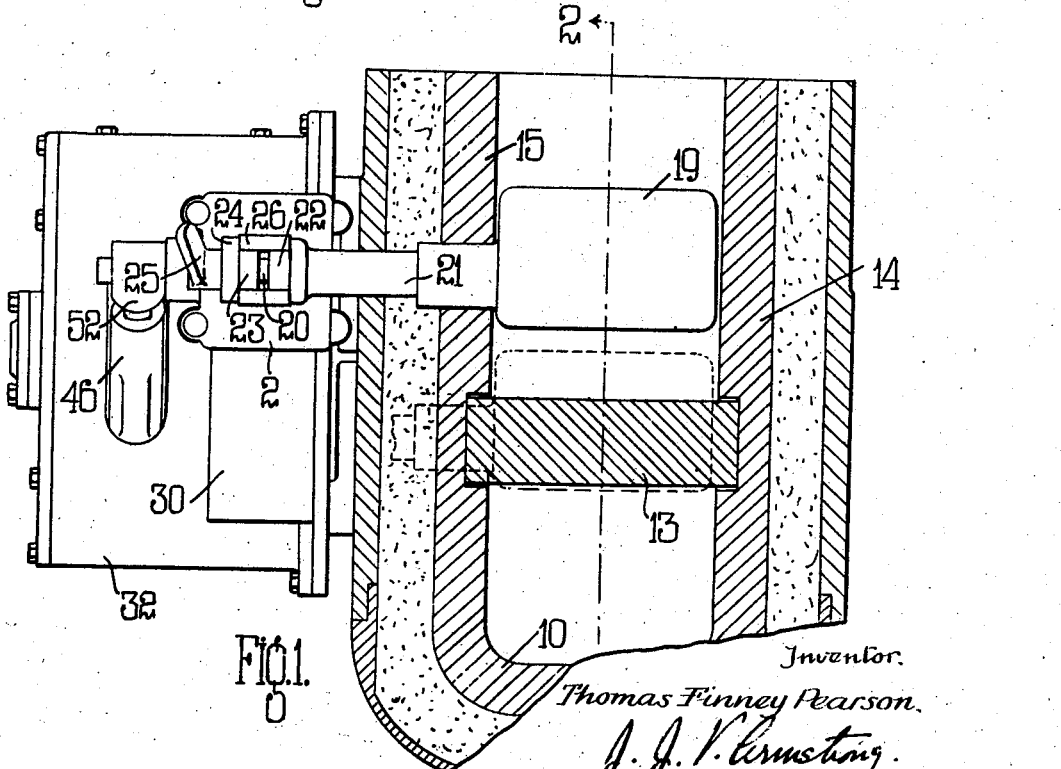
Inventor.
Thomas Finney Pearson.
J. J. V. Armstrong.
Attorneys

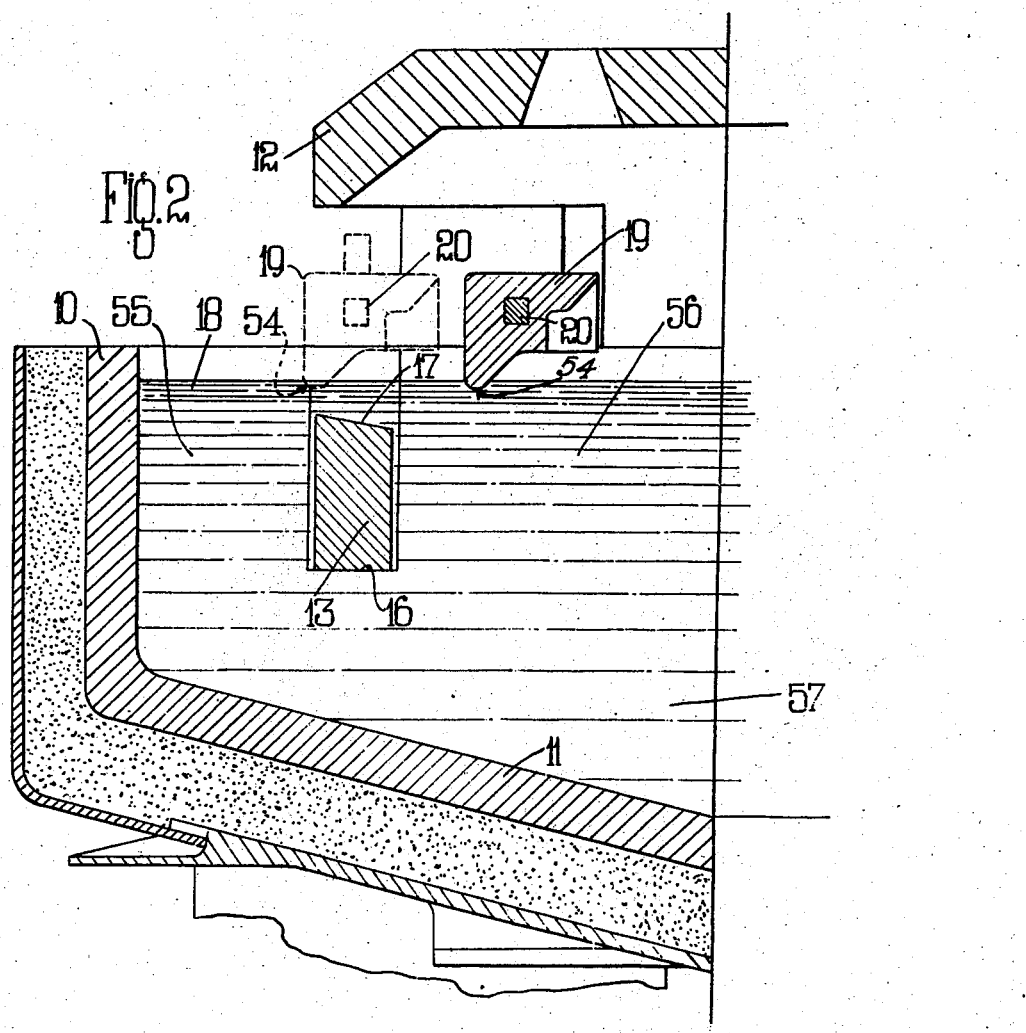

Nov. 21, 1939.  T. F. PEARSON  2,180,767
SKIMMING DEVICE FOR GLASS TANKS OR FURNACES
Filed April 29, 1937  4 Sheets-Sheet 3

Inventor
Thomas Finney Pearson
J. J. V. Armstrong
Attorneys

Patented Nov. 21, 1939

2,180,767

UNITED STATES PATENT OFFICE 2,180,767

SKIMMING DEVICE FOR GLASS TANKS OR FURNACES

Thomas Finney Pearson, Pontefract, England, assignor to Crown Cork & Seal Company, Inc., New York, N. Y., a corporation of New York Application April 29, 1937, Serial No. 139,804
In Great Britain May 2, 1936

9 Claims. (Cl. 49—56)

The present invention relates to skimming devices for glass tanks or furnaces and to the gathering of charges therefrom.

It is a well known phenomena in connection with the manufacture of articles from molten glass that the glass passing from a tank or furnace into a forehearth accumulates a relatively cold skin where it is exposed to the atmosphere. It is also well known that if a charge of glass picked up from a forehearth contains a portion of this relatively cold skin the article resulting from the moulding of the charge is defective.

The object of the present invention is to provide relatively simple means for reducing the accumulation of a relatively cold skin and for removing this out of the path of the gathering means for picking up a charge so that each charge picked up is of uniform temperature throughout its mass.

According to the present invention in a forehearth wherein a bridge is provided which extends from a height slightly below the surface of the glass to a position above the base of the forehearth to divide the forehearth into two compartments from the front of which charges are picked up by a gathering head or mould, a skimming head is adapted to dip into the surface of the molten glass and to pass rearwardly over the upper edge of the bridge during its path of travel within the molten glass whereby molten glass is withdrawn from the surface of the front compartment rearwardly over the top of the bridge and the void thus created is taken up by glass passing in the reverse direction under the bridge and upwardly into the space from which charges are taken by the gathering head or mould.

The traverse of the skimming head within the glass is outside the position from which charges are picked up from the gathering head or mould and may extend from one side of the bridge to the other. Preferably, however, said traverse commences at a position substantially coincident with the plane of the front face of the bridge and ends at a part in rear of the bridge.

The skimming head may consist of a paddle rotating about a horizontal axis but preferably a skimming head of substantially the width of the forehearth is moved in a substantially rectangular orbital path intersecting the surface of the glass in the forehearth, but in rear of the path of the gathering head when the latter is picking up a charge of molten glass, the rearward path of the skimming head within the glass being out of the vertical path of displacement of the gathering head, whereby on displacement of the skimming head within the molten glass, the latter is caused to flow from the rear of the bridge, beneath this and then upwardly in front of the bridge piece so that the volume of glass drawn rearwardly by the action of the skimming head is replaced by a mass of uniform temperature in readiness for picking up by said gathering head.

The upper end of the transverse bridge is inclined downwardly from front to rear whilst the space between the base of the forehearth and the base of the bridge constitutes a channel for the return flow of glass from the rear compartment of the forehearth of the tank or furnace to the front compartment thereof, i. e., to a position in front of the bridge piece. At the end of its rearward stroke within the glass the skimming head is elevated out of the glass whereupon it is returned to a position substantially in the plane of the front face of the bridge and then descends into the glass to repeat its movement.

The invention is more particularly described with reference to the accompanying drawings, in which—

Figure 1 is a plan view of a forehearth, skimmer, and the operating mechanism therefor, with part of the hearth and the transverse bridge in section.

Figure 2 is a section on the line 2—2 of Figure 1.

Figure 5 is a sectional view on the line 5—5 of Figure 3.

Figure 3:
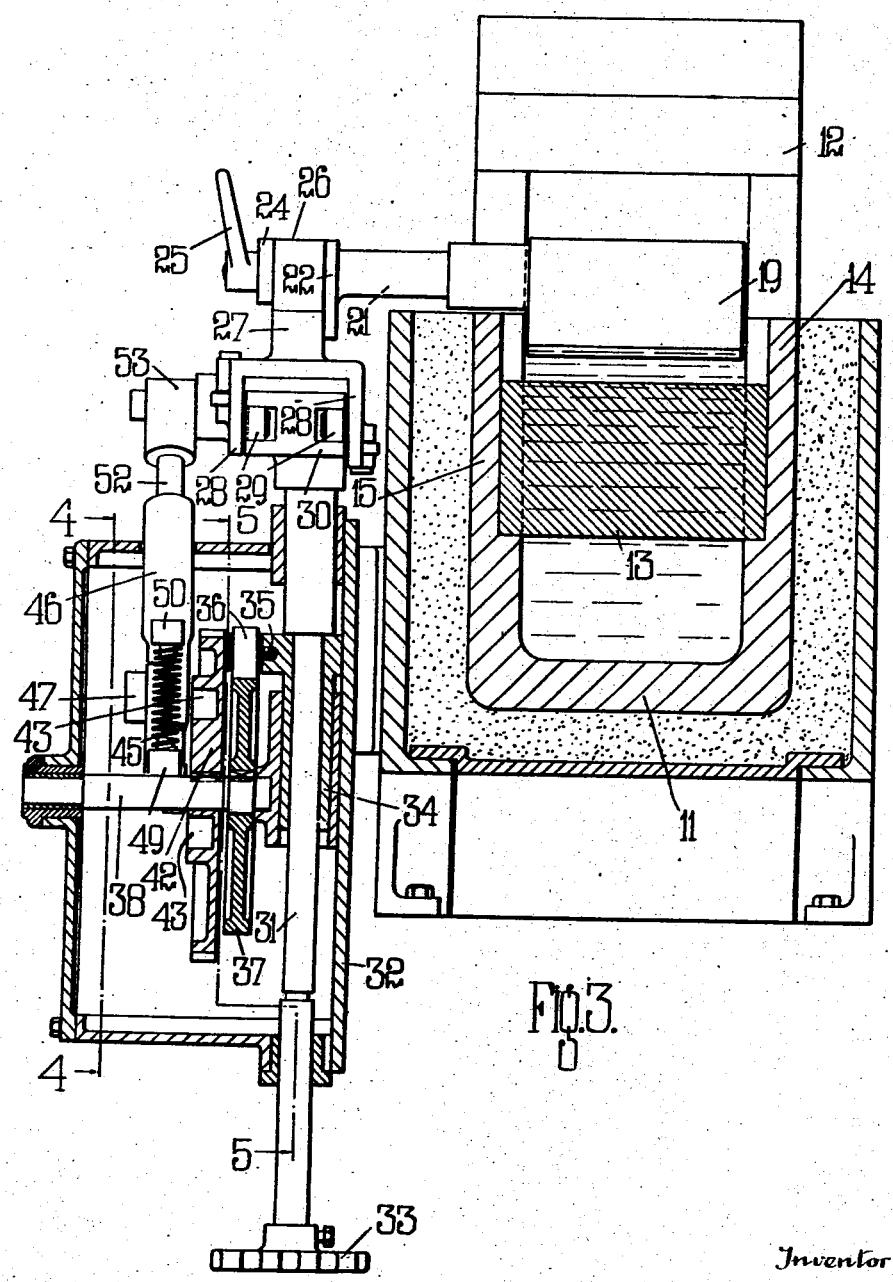
Figure 3 is a transverse sectional elevation.
Figure 4:
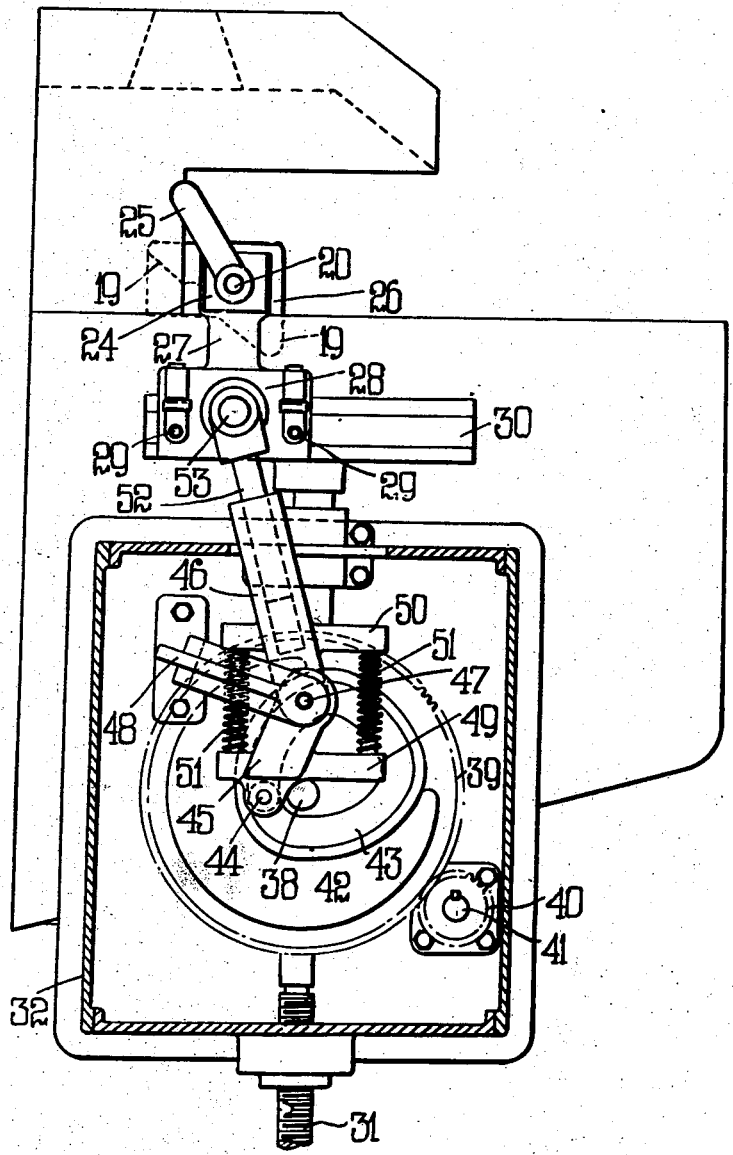
Figure 4 is a sectional view on the line 4—4 of Figure 3.

In the construction according to the drawings the front wall of a forehearth is shown at 10, the base at 11, the cover at 12, a transverse bridge 13 of refractory material being carried between side walls 14, 15, of the forehearth so that its base 16 lies above the base 11 of the forehearth. The upper end 17 of the bridge member 13 lies wholly beneath the normal level of glass within the forehearth and is inclined downwardly from front to rear.

A skimming head 19 is mounted on a shaft 20 of square section which passes through a sleeve 21 having a squared spigot 22 at one end thereof. The opposite end of the shaft 20 to that carrying the skimming head 19 also passes through a square washer 23 having a shoulder 24, and is of circular section to be engaged by a handle 25, rotation of the handle causing the spigot end 22 of the sleeve 21 and the narrow portion of the square washer 23 to be clamped by a cross head 26 with the shoulder 24 engaging against one end of the cross head.

This cross head is carried by a pillar 27 extending upwardly from a carriage 28 which is provided with rollers 29 adapted to engage with a track 30, said track being mounted at the upper end of a spindle 31 which is supported within a casing 32 and is adjustable as regards its height therein by means of a handle 33. The spindle 31 passes through a sleeve 34 the upper end of which is flanged at 35 and carries a roller 36 which is adapted for engagement by a cam 37 keyed to a cam shaft 38. The shaft 38 is driven by a spur wheel 39 from a pinion 40 on a driving shaft 41.

It will thus be seen that on rotation of the shaft 41 the cam 37 is rotated to raise the roller 36 and the spindle 31 whereby the track 30 is raised and lowered during each complete revolution of the cam 37.

The cam shaft 38 also has keyed thereto a cam 42 having a cam track 43 formed in one face thereof for engagement by a roller 44 of a bell crank connected to the carriage 28.

The bell crank consists of a pair of arms 45, 46, which overlap in the region of their pivot 47 on a rigid bracket 48 secured to the casing 32.

To enable the ends of the arms 45, 46, to overlap in the region of the pivot, said ends are stepped as shown in Figure 3. The arm 45 carries a bracket 49 and the arm 46 carries a bracket 50, springs 51 being provided between said brackets 49 and 50 to constitute a compensating device for preventing breakage in the event of seizure of the carriage 28 on the track 30 during rotation of the cams 42, 37.

The arm 46 of the bell crank has a longitudinal bore therein for the reception of a spindle 52 to the upper end of which the carriage 28 is pivotally interconnected at 53.

It will thus be seen that on rotation of the cam 42 the bell crank 45, 46, is angularly displaced about its pivot 47 because of the traverse of the roller 44 in the cam groove 43, said angular displacement of the bell crank causing longitudinal displacement of the carriage 28 along the track 30. Thus on rotation of the driving shaft 41 and corresponding rotation of the cam shaft 38 the carriage 28 is displaced longitudinally to and fro along the track 30 whilst at the ends of said displacement the track itself is raised and lowered by virtue of the cam 37.

The movement of the carriage 28 along the track and the vertical displacement of the track itself, enables the skimming head to be given a substantially rectangular orbital path from a position in which the skimming head lies substantially above the bridge member 13 to a position in rear of said bridge, these two positions being shown respectively in dotted lines and in section in Figure 2. During the rearward displacement of the skimming head the lower edge 54 of the skimming head lies beneath the glass level and when the rearward path of travel of the skimming head is completed the head is raised out of contact with the glass and returned to a position above that in which it is shown in dotted lines in Figure 2, whereupon it again descends with its lower edge 54 into the glass. Accordingly the action of the skimming head is to draw after it the skin or relatively cold upper surface of the glass in the front compartment 55 of the forehearth between the bridge 13 and the front wall 10, this skin being drawn rearwardly over the bridge 13 and into the compartment 56 in rear of the bridge 13, whilst the void in the compartment 55 is taken up by relatively hot glass which passes forwardly from the compartment 56 into the compartment 55 through the channel 57 between the base 16 of the bridge and the base 11 of the forehearth.

A gathering mould, not shown, is adapted to dip into the glass for picking up charges from the front compartment 55 thereof and it follows that the limits of the substantially rectangular orbital path of the skimming head lie outside the vertical path of displacement of the gathering head.

Accordingly, relatively hot glass can only be fed to the charging position within the compartment 55 by a vertical ascent from the base of the compartment with the result that the creation of waves in the surface of the glass on displacement of the skimming head is eliminated as is also the tendency to form blisters in the mould chambers caused by air being trapped in the path of the gathering head or mould.

It will also be appreciated that in the forward position of the skimming head this substantially forms a closure for the forehearth between the cover 12 and the surface of the glass. The skimming head therefore, which as shown in Figure 1, is substantially the width of the forehearth, assists in preventing the escape of heat from the rear compartment 56 of the forehearth.

I declare that what I claim is:

1. Apparatus for conditioning glass in a forehearth comprising a refractory bridge supported by the forehearth side walls and spaced rearwardly from the front wall of the forehearth and extending transversely thereof with its bottom surface above the forehearth floor to form a channel therebetween and with its upper surface below the normal level of glass within the forehearth, a skimmer, and means for moving said skimmer through said glass from a vertical plane adjacent said bridge to a position rearwardly thereof to draw the upper surface of relatively cold glass from the space between said front wall and said bridge rearwardly over said bridge and to circulate hot glass forwardly under said bridge to said space.

2. Apparatus for conditioning glass in a forehearth comprising a refractory bridge spaced rearwardly from the front wall of the forehearth and extending transversely thereof with its base above the forehearth floor to form a channel therebetween and with its upper surface below the normal level of glass within the forehearth, said upper surface being downwardly inclined from front to rear, a skimmer and means for moving said skimmer with its lower edge within said glass from a poition adjacent said bridge to a position spaced rearwardly thereof to draw the upper stratum of relatively cold glass from the space between said front wall and said bridge rearwardly over said bridge and to circulate relatively hot glass under said bridge and forwardly from a position in rear of said bridge to a position in front thereof.

3. Apparatus for conditioning glass in a forehearth comprising a refractory bridge supported by the forehearth side walls, extending across the forehearth and spaced rearwardly from the front wall thereof, said bridge having its lower surface spaced from the floor of the forehearth and its upper surface disposed lightly below the normal glass level and inclined downwardly from front to rear, a skimmer and members for imparting translational movement to said skimmer through a substantially rectangular orbit between a position substantially adjacent the plane of the front face of the bridge to a position in rear of said bridge, part of which orbit is in the glass in order to draw said cold glass from the front of the bridge rearwardly over the same and to circulate hot glass under the bridge to take up the void created by the withdrawal of the upper stratum of relatively cold glass.

4. Apparatus for conditioning glass in a forehearth comprising a refractory bridge spaced rearwardly from the front wall of the forehearth and extending transversely thereof with its undersurface spaced above the forehearth floor to form a channel therebetween and with its upper surface downwardly and rearwardly inclined below the normal level of glass within the forehearth, whereby the bridge is submerged in the glass, a a skimmer and means for moving said skimmer in a substantially rectangular orbital path rearwardly in the glass and forwardly out of contact therewith between positions adjacent the plane of the front face of the bridge and a vertical plane in rear thereof in order to draw the upper surface of relatively cold glass rearwardly over the bridge and to circulate relatively hot glass forwardly under the bridge where it ascends to take up the void created by the withdrawal of relatively cold glass.

5. In combination a forehearth having a forwardly disposed gathering area, a bridge extending across the forehearth rearwardly of said area, a skimmer of substantially the same width as the forehearth and adapted to work wholly outside said gathering area and means for moving the skimmer in a substantially rectangular orbital path rearwardly through the glass from the front of said bridge to a position in rear thereof to draw the surface of glass from said gathering area rearwardly over said bridge and to cause a circulation of relatively hot glass forwardly under said bridge to said gathering area exclusively by a flow upwardly from under said bridge.

6. In combination a substantially rectangular forehearth extension provided with a suction gathering area adjacent its forward wall, a refractory bridge spaced rearwardly from said forward wall and defining the rear end of said gathering area, said bridge having its lower surface spaced from the floor of said forehearth extension and its upper surface downwardly inclined and wholly beneath the normal level of the glass within said forehearth, and means for moving a stratum of glass from the upper surface of said gathering area rearwardly over said bridge and for replenishing the supply of glass in said gathering area solely by a forward and upward flow of glass under said bridge, said means comprising a skimmer and means for moving said skimmer in a substantially rectangular orbital path rearwardly through the glass outside the surface of said gathering area from substantially the plane of the front face of the bridge to a position in rear thereof and forwardly out of contact with the glass so as to return the skimmer to its original position.

7. An apparatus for conditioning glass in a forehearth having a front wall, a floor and parallel side walls, comprising a bridge having its ends supported in recesses formed in said side walls, and extending across the forehearth in spaced relation to the forehearth floor, the upper surface of said bridge being disposed below the normal level of the glass within the forehearth, whereby the bridge is submerged in the glass, a skimmer, and means for moving said skimmer through the glass from a vertical plane adjacent said bridge to a position rearwardly thereof to draw the upper surface of relatively cold glass rearwardly over said bridge and to circulate hot glass forwardly under the bridge.

8. The combination with a forehearth having a floor, a front wall, and parallel side walls having recesses formed therein, of a bridge extending across the forehearth in spaced relation to the floor and the front wall of the forehearth, said bridge having its ends supported in said recesses and having its upper surface inclined downwardly and rearwardly and disposed beneath the level of the glass in the forehearth, a skimmer of substantially the same width as the forehearth, and means for moving the skimmer from a line substantially coincident with the front face of the bridge rearwardly in the glass to a line spaced to the rear thereof, to draw the upper surface of the glass in front of the bridge rearwardly thereof and to circulate hot glass forwardly under the bridge.

9. In combination, a forehearth having a floor and parallel side walls recessed to provide horizontal supporting surfaces, a bridge submerged in the glass in the forehearth having its ends positioned on said supporting surfaces and its lower face spaced above said floor, a skimmer, and means for moving the same through the glass from a forward point substantially above the bridge, rearwardly over the bridge, in contact with the glass to a rearwardly disposed point behind the bridge, to circulate hot glass forwardly under the bridge.

THOMAS FINNEY PEARSON.